US005448929A

United States Patent [19]

Sundström

[11] Patent Number: 5,448,929

[45] Date of Patent: Sep. 12, 1995

[54] METHOD FOR HARDFACING OF CHAINSAW AND GUIDE BARS

[75] Inventor: Erik Sundström, Sandviken, Sweden

[73] Assignee: Sandvik AB, Sandviken, Sweden

[21] Appl. No.: 284,678

[22] PCT Filed: Dec. 20, 1993

[86] PCT No.: PCT/SE93/01089

§ 371 Date: Sep. 9, 1994

§ 102(e) Date: Sep. 9, 1994

[87] PCT Pub. No.: WO94/14560

PCT Pub. Date: Jul. 5, 1994

[30] Foreign Application Priority Data

Dec. 18, 1992 [SE] Sweden ................................ 9203813

[51] Int. Cl.[6] ........................ B23D 63/00; B23K 31/02; B27B 17/02

[52] U.S. Cl. ........................................ 76/112; 30/383; 164/80; 164/98

[58] Field of Search .......................... 30/381, 383, 387; 76/112, 115, 101.1, 108.2, DIG. 3, DIG. 6; 164/80, 98

[56] References Cited

U.S. PATENT DOCUMENTS

| | | | |
|---|---|---|---|
| 2,962,812 | 12/1960 | Gommel | 30/383 X |
| 3,241,228 | 3/1966 | Rayniak et al. | 76/112 X |
| 3,416,578 | 12/1968 | Irgens | 30/387 |
| 3,744,363 | 7/1973 | Espana et al. | 30/383 |
| 3,858,321 | 1/1975 | Conaty | 30/383 |
| 3,987,543 | 10/1976 | Rätz et al. | 30/383 |
| 4,742,861 | 5/1988 | Shoher et al. | 164/80 |
| 4,768,289 | 9/1988 | Apfel et al. . | |
| 5,144,867 | 9/1992 | Yajima et al. . | |

*Primary Examiner*—Douglas D. Watts

*Attorney, Agent, or Firm*—Burns, Doane, Swecker & Mathis

[57] ABSTRACT

Method for hardfacing of parts of the edges of a chainsaw guide bar, where the chain is guided by a groove, where a wear-resistant alloy is applied in a molten state to parts of the edges (12,13) of a guide bar blank and solidified in nearly final configuration, comprising the steps of:

making a guide bar blank (10) having edges located at greater distance from the groove bottom (18) along the sides (17) which are not to be hardfaced than in those parts (12,13) which are to be hardfaced, and applying a mold (15) with an extending plate (14) against the blank with the edge (23) of the plate in contact with the groove bottom (18), and filling the space between the wall (19) of the mold and the edges (12,13) of the blank with a paste (16) made from finely powderized hardfacing alloy and a liquid, and heating the paste (16) locally to melt the alloy.

8 Claims, 1 Drawing Sheet

METHOD FOR HARDFACING OF CHAINSAW AND GUIDE BARS

BACKGROUND

It is previously known from the patents U.S. Pat. Nos. 3,416,578 and 4,768,289 to coat a severely loaded edge with some hard and wear-resistant metal layer at the nose of such chainsaws that do not have a nose sprocket. This applies to chainsaws used to cut minerals, or to cut wood where mineral grains may be lodged in the bark or stirred from the ground. Traditionally the edge has been coated with cobalt alloys, such as known by the trademark "Stellite", applied by gas welding. These have a very high surface tension when molten, and will not run off or sag until they have solidified. The weld metal will form a thick rounded bead along the edge, and much of the deposited metal will have to be ground off to form a smooth running face for the saw chain.

Cobalt alloys are relatively expensive, and not very resistant to acidic wood. Nickel alloys with equal or better resistance and lower cost are known, but can not be used in the same way since they have too low surface tension when molten. They might be applied through flame or plasma spraying, where a finely powderized alloy is introduced in a stream of hot gas and transferred as molten droplets to the surface of a cold work piece. This method will also consume more material than will ultimately stay on the guide bar and requires much work to grind away the excess.

Hardfacing alloys can also be applied according to the patent U.S. Pat. No. 5,144,867 by inserting one end of a guide bar blank in a mold filled with powderized alloy, heating the mold and the blank to the melting point of the alloy to let the alloy form a wear resisting layer on the blank, and finally milling or grinding a chain groove through the layer. According to that patent, the grinding work on the edges and on the outside of the guide bar is reduced.

OBJECTS AND SUMMARY

The present invention concerns a method for applying hard wear-resistant layers, which also reduces the need for grinding of the groove, and which creates less environmental problems than other alloy powder methods. This is important, since dust from nickel as well as cobalt alloys are allergenic and injurious to health.

An object of the invention is to provide the edges of the nose part of a guide bar with a hard wear-resistant layer, one edge at a time when the chain groove is already made, and the chain groove is blocked during the process by a plate extending from a mold.

DETAILED DESCRIPTION OF PREFERRED EMBODIMENTS

Figure 1:
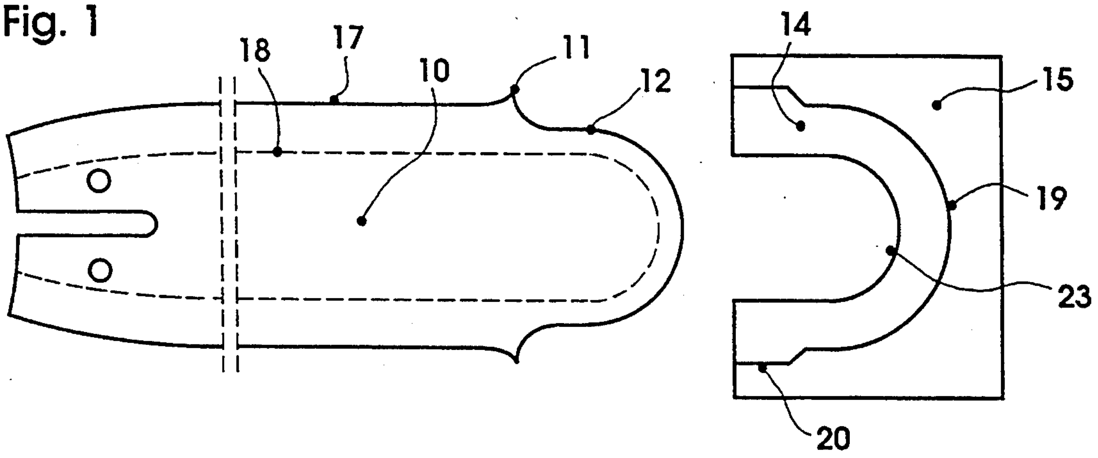
FIG. 1 shows a lateral view of a guide bar blank (10) prepared for hardfacing and a mold (15)

The guide bar blank (10) preferably comprises three spot-welded thin plates and or of one solid thicker plate is provided with a chain groove along its sides (17) and around the nose (12). The groove is formed either by making the middle plate of the three thin plates narrower than the outer plates, or by grinding or milling a groove in the edge of the thicker plate. The bottom (18) of the groove runs continuously from one side around the nose to the other side. Along the sides (17) the edges are located at a greater distance from the bottom (18) than they are at the nose (12). Where the sides (17) meet the nose (12) it is advantageous to make the edge with a locally raised portion (11) even further from the bottom (18).

The hardfacing layer is shaped against a mold (15) from which extends a plate (14) with a thickness matching the width of the chain groove, and with a contour matching the groove bottom at the nose. At the mold the plate (14) borders to a wall (19) with the same curvature as the nose of the completed guide bar. If the sides are made with raised portions (11) the wall (19) should have matching diversions (20) at its ends. Suitable materials for the mold are copper or ceramic.

Figure 2:
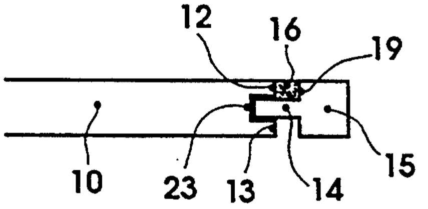
FIG. 2 is a cross section through the mold and the nose part of the guide bar when assembled prior to the melting of the alloy.

The wear-resistant alloy is preferably a nickel alloy, finely powderized and mixed with a liquid such as ethanol to a paste. When the mold (15) has been applied to the guide bar blank (10) and the plate (14) is in contact with the groove bottom (18) as shown in FIG. 2, the paste (16) is pressed into the space between the wall (19) of the mold and the edge (12) of the guide bar blank on at least one side of the nose. The paste (16) is then heated with a gas torch or a laser without heating the blank or the mold more than locally through contact with the paste (16). The liquid is evaporated and the alloy powder melts, to form a hard layer on the edge (12) upon solidification. The blank (10) is turned over and the process is repeated on the edge (13) of the other side. By using a paste rather than powder, spreading of dust through vibrations and gas flow is avoided. A paste can also be applied in a thicker layer, higher than the surface of the blank to ensure that the molten alloy will be level with the blank surface after evaporation of the liquid.

Figure 3:
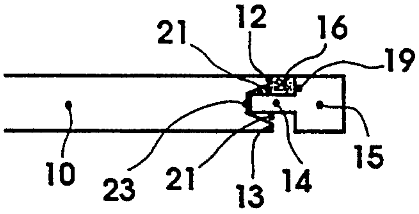
FIG. 3 is a corresponding section through an alternative form of the invention, and FIG. 4 a lateral view of the nose part of a guide bar after hardfacing but before final grinding.
Figure 4:
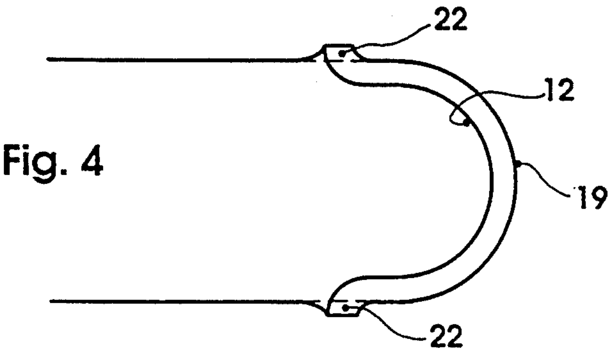

The thickness of the hard wear-resistant layer at the nose edges (12,13) is chosen to last as many hours of sawing as other stressed parts of the guide bar. If this thickness is fairly small, it may be desirable to let the hard layer extend further down into the groove towards the bottom, at least to a depth corresponding to how deep the drivelinks of the chain reach. In such case the groove in the blank can be made with chamfers (21) as shown in FIG. 3, to let the molten alloy penetrate further into the groove.

When the paste (16) melts the molten-alloy is restrained from running out of the mold by the contact between the raised portion (11) of the blank and the diversion (20) of the wall (19). In this region where melting commences and finishes it is often difficult to get a homogeneous layer, and the small protrusions (22) containing the inhomogenities can easily be ground off. All other parts of the hardfacing layer have already their final shape without further machining. It may, however, be advantageous to polish the layer where it was formed against the mold wall (19) to get a smooth sliding surface from the very beginning.

The same method can be used to hardface other highly stressed parts of the guide bar contour, such as near the attachment end where the chain settles on the bar after having circled the drive sprocket and where severa impact stresses occur.

Compared to related methods, such as U.S. Pat. No. 5,144,867, the present method offers the advantages of producing a finished surface within the groove, of requiring less alloy since the layer thickness can be optimized for the edge while still letting the alloy extend far down in the groove in the chamfers, and of not requiring heating of a major part of the blank. The only disadvantage is that two heating operations are required, one on each side.

I claim:

1. A method for hardfacing parts of edges of a chainsaw guide bar where the saw chain is guided by a groove, comprising the steps of:

making a guide bar blank having edges located at a greater distance above a groove bottom along sides which are not to be hardfaced than in those parts which are to be hardfaced, applying a mold with an extending plate against the blank with an edge of the plate in contact with the groove bottom so as to create a space, filling the space between the wall of the mold and the edges of the blank with a paste made from a finely powderized hardfacing alloy and a liquid, and heating the paste locally to melt the alloy.

2. Method according to claim 1, wherein the hardfacing is applied to a nose portion of the blank.

3. Method according to claim 1, wherein the blank has locally raised edges where the edges of the blank to be hardfaced meet the sides which are not to be hardfaced, and the mold wall has diversions at corresponding locations.

4. Method according to claim 1, wherein the mold is made of ceramic material.

5. Method according to claim 1, wherein the mold is made from copper.

6. Method according to claim 1, wherein the paste is heated by a gas torch.

7. Method according to claim 1, wherein the paste is heated with a laser.

8. Method according to claim 1, wherein the groove has chamfers to allow the molten alloy to penetrate deeper along inside walls of the groove.

* * * * *